United States Patent
Nölscher et al.

[11] Patent Number: 6,080,502
[45] Date of Patent: Jun. 27, 2000

[54] FLUID-COOLED FUEL CELL WITH DISTRIBUTION DUCTS

[75] Inventors: Christoph Nölscher, Nürnberg; Arno Mattejat, Bubenreuth, both of Germany

[73] Assignee: Siemens Aktengesellschaft, Munich, Germany

[21] Appl. No.: 09/117,149
[22] PCT Filed: Dec. 18, 1996
[86] PCT No.: PCT/DE96/02451
  § 371 Date: Jul. 23, 1998
  § 102(e) Date: Jul. 23, 1998
[87] PCT Pub. No.: WO97/27638
  PCT Pub. Date: Jul. 31, 1997

[30] Foreign Application Priority Data

Jan. 23, 1996 [DE] Germany .......................... 196 02 315

[51] Int. Cl.⁷ .................................................. H01M 2/00
[52] U.S. Cl. ................................ 429/34; 429/38; 429/39; 429/26; 429/120; 204/242
[58] Field of Search ................... 429/34, 38, 39, 429/120, 26, 35, 19; 204/242, 245

[56] References Cited

U.S. PATENT DOCUMENTS

| | | |
|---|---|---|
| 3,575,719 | 4/1971 | Nelson et al. |
| 4,678,724 | 7/1987 | McElroy ..................................... 429/34 |
| 5,514,487 | 6/1997 | Washington et al. ...................... 429/39 |
| 5,635,039 | 6/1997 | Cisar et al. ............................... 204/252 |

FOREIGN PATENT DOCUMENTS

| | | |
|---|---|---|
| 33 21 984 A1 | 6/1983 | Germany . |
| 33 23 491 A1 | 6/1983 | Germany . |
| 39 07 819 A1 | 10/1989 | Germany . |
| 42 34 093 A1 | 9/1992 | Germany . |
| 2 158 989 | 2/1985 | United Kingdom . |
| WO 96/37005 | 2/1985 | WIPO . |

OTHER PUBLICATIONS

Publication entitled: "Effiziente Nutzung fossiler Energieträger mit Brennstoffzellen" by Christoph Nölscher.

*Primary Examiner*—Stephen Kalafut
*Assistant Examiner*—R Alejandro
*Attorney, Agent, or Firm*—Hill & Simpson

[57] ABSTRACT

The invention relates to a fluid-cooled fuel cell, in which the cell surfaces are supplied with reaction media via axial supply ducts and radial distribution ducts, the distribution ducts being located in the cell surface and running along the edge of the cell surface, with the open side toward the active surface.

According to the invention, the supply and distribution ducts in a fuel-cell stack are arranged such that distribution ducts are arranged in the edge region of the cell surfaces, as a result of stacking and staggering, in such a way that the inlet of the medium to the cell surface along a distribution duct is not carried out in a point-like manner, and that the entire cell surface is uniformly supplied with medium.

13 Claims, 4 Drawing Sheets

FLUID-COOLED FUEL CELL WITH DISTRIBUTION DUCTS

BACKGROUND OF THE INVENTION

The invention relates to a fluid-cooled fuel cell, in which the cell surfaces are supplied with reaction media via axial supply ducts and radial distribution ducts.

Patent application 44 42285.7 (94 P 3704), which has not yet been published, describes a battery that comprises fuel cells and in which the cell surfaces are also supplied via axial supply ducts and radial distribution ducts. However, this design is primarily suitable for fuel cells which are cooled via direct air cooling, since neither distribution ducts nor supply ducts for coolant are provided. Batteries comprising fuel cells have to be cooled more intensively as the power density per unit area of the battery increases. In many cases, pure air cooling is not sufficient, because of its limited heat transfer. Fluid cooling would therefore be necessary, but in the case of fuel cells of this type it is possible only by replacing the cooling medium air with a fluid, which is guided in an external vessel which encloses the entire battery. The problem here is, on the one hand, that the fluid may come into direct contact with the electrolyte (which leads to creepage currents and to corrosion) and, on the other hand, that the container takes up space. Practical fluid cooling is therefore not yet available for this design.

Although DE 42 34 093 discloses the corrosion-free cooling of cell surfaces of a fuel cell using a liquid, it does not disclose any design which ensures uniform inflow to the surfaces which are to be cooled and those which are active. Instead, in this prior art, the result of a point-like inlet is a diagonal flow of the media over the cell surfaces, which is accompanied by an undersupply to those marginal regions of the cell surface that are adjacent neither to an inlet opening nor to an outlet opening. As a result, the performance of the fuel cell is reduced by comparison with a uniform supply to the surfaces. Furthermore, the constructional elements that are disclosed in that document require high production costs, since the individual supply and distribution ducts have to be terminated in a gastight manner by means of one or more collecting lines. Both the high production costs and the partial undersupply to the cell surface have a detrimental effect on the attractiveness of the fuel cell as one of the energy converters of the future.

SUMMARY OF THE INVENTION

It is therefore an advantage of the present invention to provide a compact fuel cell which is capable of mass production, has fluid cooling and whose simple design enables uniform inflow to the cell surfaces, without increasing the cell thickness.

The general discovery of the present invention is that distribution ducts in the edge region of the cell surfaces can be fitted, by means of stacking and staggering, in such a way that uniform inflow to the cell surfaces takes place, using a plurality (three as a rule) of media, the inflow speed of the media being reduced, at the same time the production costs being lowered by eliminating a plurality of connecting lines which, according to the prior art, are welded joints, and a reduction in the cell thickness (space requirement of the fuel cell axially in relation to the cell surface) in the case of fluid-cooled batteries results from possibly dispensing with two intermediate elements between the individual cells of a fuel-cell block, and from eliminating the axial space requirement of the fluid cooling.

The subject of the invention is a fuel cell with fluid cooling, which comprises a cathode, an electrolyte and an anode, at least one distribution duct for supplying the cell surface with medium being provided and being fitted in the cell surface in such a way that the cell surface is supplied with medium from this distribution duct and along the edge of the cell surface.

A fuel cell and/or a fuel-stack according to the invention can be operated by self-induction, that is to say using only one axial supply duct for supplying the anode with fuel and a further supply duct for supplying the cooling surfaces, but without a supply duct to the cathode. The same applies to the discharge ducts.

One embodiment of the invention contains the distribution ducts in a radial (perpendicular) position in relation to the axial supply ducts, but the invention is not restricted to this geometrical arrangement of the ducts; rather it may be realized with a multiplicity of simpler and more complicated positions of the supply and distribution ducts in relation to one another. In this case, it is possible to consider a curved connecting point of the distribution duct to the supply duct, or else the fitting of the distribution duct on the axial duct at an angle that is different from 90°.

According to a further refinement of the invention, the supply and distribution ducts are of tubular design, but it is also possible for the ducts to assume any other shape that is suitable for the transport of the medium in a fuel cell. It may be that the design of the fuel cell requires the ducts to be wholly or partially angular. In particular, it is also possible for the insides of the ducts to have different surface structures, which have a different influence on the flow of the medium in or out of the ducts. The surface structure of the inside of the duct may be shaped from the materials of the components forming the duct. The inside can also be of single-part or multipart design (for example with coatings or elevations, which have an influence on the flow behavior of the medium), it being possible for any materials to be selected.

In the case of particularly space-saving embodiments, it is advantageously also possible to provide a design in which a supply duct is accommodated in the region of the cell surface, for example centrally.

In principle, the fuel cells may have any shape. However, a particularly preferred embodiment is the flat rhomboidal fuel cell and, in particular, the fuel cell of rectangular configuration. The cell surfaces of such fuel cells hitherto always had undersupplied regions, since the medium inside the cell was guided only in two flow directions, namely at first in the axial direction toward the cell surfaces and then over the cell surface diagonally via point-like inlet and outlet openings. In the case of the diagonal flow over the cell surface it has for a long time always been necessary to tolerate undersupplied regions over the cell surface along the other diagonal axis.

According to the invention, in the case of a flat rhomboidal fuel cell it is, then, advantageous that the distribution ducts are provided along the side edges such that the length of the distribution ducts assumes at least 50 percent of the respective side edge length. It is particularly preferable if, in this case, the lengths of the distribution ducts are between 80 and 100 percent of the side edge length, that region of the cell surface that is connected both to an incoming distribution duct (which is coupled to the inlet opening of the supply duct), and to an outgoing distribution duct (which is coupled to the outlet opening of the supply duct) becoming greater.

Fluid cooling is also to be understood as so-called heat-pipe cooling, in addition to the cooling systems which conventionally come under this heading.

The embodiment in which the cell thickness of a fuel cell remains constant, in spite of additional fluid cooling, is also particularly preferred. According to the invention, this is achieved by the cooling medium being guided simply between the individual fuel cells in a stack, rather than in a space provided especially for this. This embodiment is explained in more detail in the figures.

The distribution ducts may be arranged so that they are staggered and/or stacked in relation to one another, the embodiment in which the distribution ducts are arranged only stacked having a simpler edge construction, but this being associated with the disadvantage of a higher cell thickness. The space-saving embodiment has a combined staggered and stacked arrangement of the distribution ducts.

According to the invention, fuel cells denotes low-temperature, medium-temperature and high-temperature fuel cells. Some examples may be cited by way of example: the proton-conducting polymer electrolyte membrane cell (PEMFC), the phosphoric acid cell (PAFC) and the alkali fuel cell (AFC). In the last-mentioned, it is possible for the cooling medium to be identical to the electrolyte.

The "edge" is to be understood as the outer boundary line of the active surface.

"Side edge" is the cell edge in the special case in which the cell surface has corners, the term not being restricted to sharp corners but also comprising rounded corners.

The "active surface" or "active cell surface" denotes in the fuel cell or in the battery constructed from fuel cells, all the surfaces at which ions migrate through the electrolyte.

"Cell surface" denotes all surfaces in the fuel cell or in the fuel-cell stack which can be seen in the plan view of the cell. Accordingly, the cell surface may comprise the widest range of materials, depending on their function. Materials which may be mentioned by way of example as materials for cell surfaces at which the current pick-off takes place over the active surfaces and which serve to delimit the reaction spaces (that is to say for the so-called separators) are graphite, titanium and/or metal alloys. In order to make the current pick-off uniform, use is made of fabrics, nets or papers made of materials which are similar to those of the separators. Frame regions are formed from plastic, for example.

The active surface may have any shape, it being unnecessary for it to assume either the shape of the fuel cell or, if appropriate, the external shape of its frame. The distribution of the media in the interior of the cells on the active surfaces and the cell surfaces may take place through ducts, for example flutes, that are impressed into the separators. However, said distribution can also equally well be effected by other measures, such as inlaid obstacles, knobs, nets and meshes. The materials of the respective obstacles are in each case adapted to the required functions. The ducts that are impressed into the separators may be, as stated, flutes and grooves, which for their part in turn run in a straight line, winding or curved manner.

The edge regions of the cell surfaces may, as stated, be made of the same material as the active surface itself, but may also be made of different and nonuniform material. They may be flat, provided only with the distribution ducts or they may also themselves have a more complicated surface structure or shape. Inside a fuel-cell stack, it is not necessary for the cells and hence also the cell surfaces all to be of identical construction; rather, each cell may be configured individually, depending on what appears practicable.

The media may be guided in any way in relation to one another, for example in counterflow, parallel flow or cross-flow.

In the sense of the present invention, "medium" denotes firstly all those gases and liquids which are able to act as an oxidant in fuel cells. Examples which may be mentioned are air, oxygen and any mixtures of these components. Furthermore, medium denotes any type of fuel, such as hydrogen, methanol, synthesis gas and/or reformer gas, as well as natural gas. Moreover, medium denotes any cooling medium that can be used, such as water and air, it being possible, in the case of PAFC and AFC, for the cooling medium also to mean the electrolyte.

The operation of the fuel cell may, as already mentioned, be by self-induction, by forcible flow as a result of an impressed air flow and under pressure. Furthermore, any other possible operation of the fuel cell or of the battery, using the design according to the invention, is conceivable.

In this connection, reference is made to the publication by the co-inventor Dr. Nölscher in "Klimaverträgliche Energienutzung und Energiememorandum 1995 der DPG zum Klimagipfel", Proceedings of the AKE at the Spring meeting of the DPG, (March 1995), reference being made to the full content thereof and whose disclosure content is the subject of the present description.

The "connecting line" is to be understood as all welded, adhesively bonded, soldered and other joints, using which different spaces within a fuel-cell stack and/or within a fuel cell can be closed off tightly with respect to one another.

The contact line is understood to be the line of a cell surface, for example one similar to a corrugated metal sheet, which touches the cell surface located above or below it. A contact line bounds a flute or groove on one side on a cell surface, but as a rule does not close the former off tightly.

A "supply duct" is understood, according to the invention, as any duct which transports a medium to or away from a cell surface. "Distribution duct" is understood to mean ducts in which the unconsumed medium flows towards the cell surface for conversion, and also those ducts in which the medium collects after conversion has been carried out. Therefore, in the following text, no distinction is drawn either between supply and disposal ducts nor between distribution and collection ducts.

Depending on the requirements, the fuel cell may have various sealing-off designs at the edge regions. It is therefore possible to use both edge seals according to filter-press technology within the framework of the present invention, as well as seals having frame elements. In the case of using frame elements, it is possible to provide spaces having additional sealing in relation to the individual fuel cells, for example those of a battery.

In the case of many types of sealing, it is at the same time possible to provide the axial media guidance in the outer sealing frame. The axial media guidance may be provided by means of a supply duct, which has at least one inlet or outlet opening in order to supply a cell surface. Via a dedicated supply duct, the respective medium is transported toward the cell surface before its conversion, and is transported away from the cell surface following its conversion. According to the invention, at least one of the inlet or outlet openings of the supply duct opens, at the level of a cell surface, into a distribution duct which, for its part, has various openings along its open side, said openings possibly being designed as a large open side or else in the form of many individual openings, facing the cell surface. The "open length" of the distribution duct denotes the length of the open side of the distribution duct which is open towards the cell surface.

As a rule, the three flow directions which the medium assumes in the two ducts and on the cell surface are in each case approximately transverse in relation to each other, so that in a special case of the novel fuel cell, the three flow directions of the medium (firstly in the supply duct, then in the distribution duct and finally on the cell surface) cover a three-dimensional space.

A plurality of distribution ducts may be arranged within one fuel cell so that they are stacked and/or staggered. The fuel cell itself may assume any shape, even a complicated shape, depending on the purpose for which the fuel cell is envisaged, preferably also the possibility that the fuel cell assumes a flat rhomboidal or rectangular shape. In the case of this possibility for the novel fuel cell, at least one cell surface has side edges.

These side edges are constructed in the edge region of the cell surface, which edge region, as already mentioned, may be different, in material and in the surface configuration, from the cell surface itself. "Stacking" in this case means that the distribution ducts are arranged one behind another, that is to say axially in relation to the cell surfaces, whereas the "staggering" means an offset arrangement of the distribution ducts, parallel and on a level with the cell surface. As a result of the novel system of the staggered and stacked arrangement of distribution ducts, a lowering of the cell thickness, by comparison with the purely stacked arrangement, in the case of fuel cells having fluid cooling is brought about. The reduction in the cell thickness is of particular advantage, especially in the mobile use of the fuel cell.

All the definitions contained in the description also apply to the claims, to the abstract and to the explanation relating to the figures.

In an embodiment, the fuel cell of the present invention comprises a cell surface comprising a cathode, an anode and an electrolyte disposed between the cathode and the anode. The cell surface further comprises an underside and a side edge. The side edge has a length. The fuel cell further comprises a coolant distribution duct that extends along at least 50% of the length of the side edge. The coolant distribution duct is in communication with the underside of the cell surface and provides coolant to the underside of the cell surface.

In an embodiment, the fuel cell of the present invention further comprises an oxidant distribution duct and a fuel distribution duct. The oxidant distribution duct and fuel distribution duct are disposed parallel to the coolant distribution duct and extend along the side edge of the cell surface. The coolant, oxidant and fuel distribution ducts are vertically staggered with respect to each other.

In an embodiment, the coolant distribution duct is connected to a coolant supply duct which is disposed perpendicular to the coolant distribution duct.

In an embodiment, the fuel distribution duct is connected to a fuel supply duct which is disposed perpendicular to the fuel distribution duct.

In an embodiment, the cell surface further comprises a plurality of side edges, each of the side edges having a length and the coolant distribution duct extends along at least 50% of the length of one of the side edges.

In an embodiment, the coolant distribution duct extends along at least 80% of the length of the side edge or one of the side edges.

In an embodiment, the coolant distribution duct is laterally staggered along the side edge with respect to at least one of the oxidant and fuel distribution ducts.

In an embodiment, the coolant distribution duct is laterally staggered along the side edge with respect to both the oxidant and fuel distribution ducts.

In an embodiment, the fuel cell further comprises first and second opposing side edges. A first coolant distribution duct extends along at least 50% of the length of the first side edge and a second coolant distribution duct extends along at least 50% of the length of the second side edge. The first coolant distribution duct is connected to a coolant supply duct and the second coolant distribution duct is connected to a coolant disposal duct. Both the first and second coolant distribution ducts being in communication with the underside of the cell surface.

In an embodiment, the fuel cell further comprises a first oxidant distribution duct and a first fuel distribution duct disposed parallel to and vertically staggered with respect to the first coolant distribution duct. Similarly, said embodiment further comprises a second oxidant distribution duct and a second fuel distribution duct disposed parallel to and vertically staggered with respect to the second coolant distribution duct.

Other objects and advantages of the present invention will become apparent from reading the following detailed description and appended claims, and upon reference to the accompanying drawings.

BRIEF DESCRIPTION OF THE DRAWINGS

Further advantageous refinements of the invention are described in the subclaims and will be explained with reference to the following figures, wherein:

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
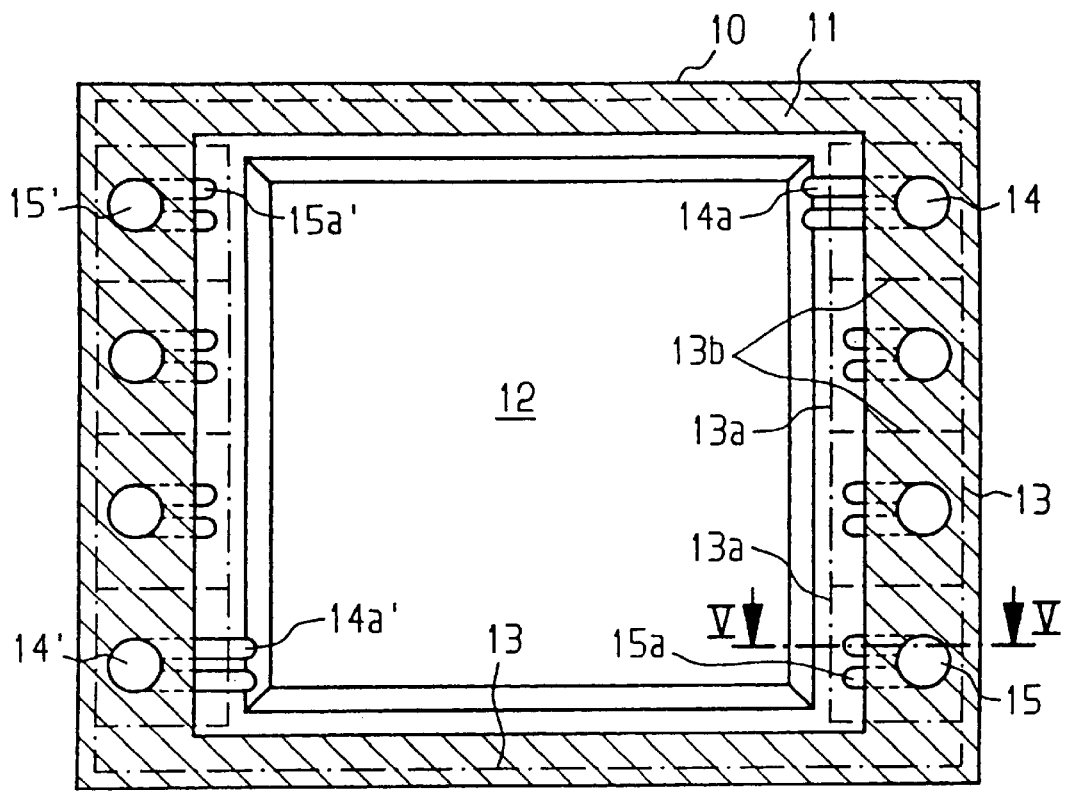
FIG. 1 therefor a plan view of a cell surface in a fuel-cell block corresponding to the prior art (German Offenlegungsschrift 42 34 093 A1)

The cross-section of FIG. 1 shows a top view of a fuel-cell battery according to the prior art, and shows a cell surface which is enclosed by the line 10, in which an edge region 11 can be seen hatched. The active surface 12, at which the conversion takes place, is located in the center, enclosed on all sides by the edge region 11. Located in the edge region 11 are connecting lines 13, which are drawn dash-dotted.

Corresponding to the prior art, in addition to the connecting line 13 that runs around the entire edge region, in each case two further connecting lines 13a are necessary, which run along the two opposite side edges on which the supply ducts are located. In addition to these connecting lines 13a, in each case still further connecting lines 13b are needed on the two side edges of the cell surface, in order to separate the supply ducts from one another in a gastight manner.

According to FIG. 1, the cooling medium, for example water, flows through the supply duct 14 and the two distribution ducts 14a on the two surfaces, between the cathode space and the anode space, which have to be cooled. The inlet takes place via two distribution ducts 14a, from whose point-like inlet opening the cooling medium could be distributed over the entire surface, but flows mainly in the diagonal direction to the distribution ducts 14a'. Via the distribution ducts 14a' and the supply duct 14', the used (heated) cooling medium is transported away from the cell surface again. Because of this diagonal flow of cooling medium along the cell surface, it may be assumed that the regions which are adjacent to the supply ducts 15 and 15' are undersupplied. This regional undersupply of the cell surface of the fuel cell effects not only a temperature drop within the cell surface, which impairs the homogeneity of the performance, but also reduces the maximum performance of the fuel cell, since the maximum operating temperature of the fuel cell depends on the regions which cannot be cooled in an optimum fashion.

An opposed diagonal distribution on the cell surface is experienced by the medium which passes through the supply duct 15 onto the active surface of the cell surface. This medium is one of the reactive media, such as fuel or oxidant. In both cases, there is once more an undersupply of the diagonal corner regions of the cell surface that are not included, which results in a reduction in the performance of the device because of the unused active surface. It is not necessary to explain more precisely that the undersupply to regions of the cell surface is disadvantageous for the efficiency of the fuel cell.

Figure 2:
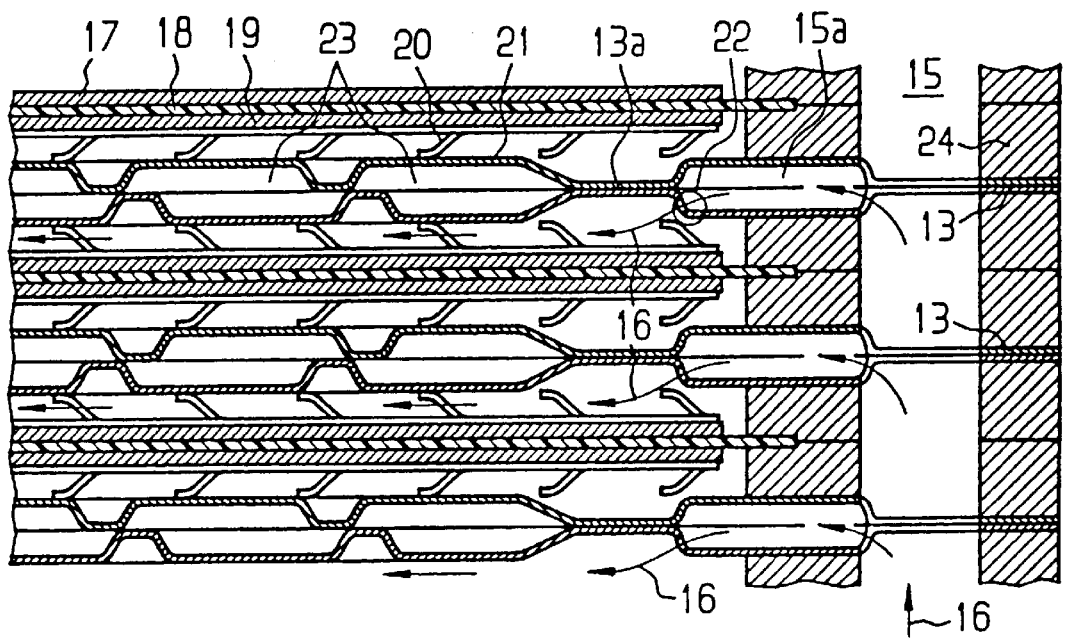
FIG. 2 therefor a partial cross section, axially in relation to a cell surface, through a fuel-cell block corresponding to the same prior art.

FIG. 2 shows a cross section along the axis V—V of FIG. 1. On the extreme right, it is possible to see the outermost edge of the fuel-cell block with the sealing regions 24. The sealing regions 24 of the respective individual fuel cells are connected to one another in a gastight manner at the connecting line 13. Alongside this, on the left, it is possible to see a cross-section through the axial supply duct 15, in which the fuel 16 flows from bottom to top. The entire depiction of FIG. 2 comprises three fuel cells, which can be seen at the respectively repeating units of the anode 17, the electrolyte 18 and the cathode 19. At the top and bottom, adjacent to a respective fuel cell, there is the separator 21, which conducts electricity and heat, and the adjacent electrode, which in each case bounds the cathode space or anode space. The terminating separator 21 of each fuel cell in the stack is connected to the terminating separator 21 of the subsequent fuel cell in the stack in such a way that a cooling medium can flow along the separators. In the present FIG. 2, the medium 16 flows through the axial supply duct 15 into the radial distribution ducts 15a. From the distribution ducts, the medium flows through the holes 22 in a point-like manner into the anode space and directly onto the anode, the anode space being defined by the separator 21 and the anode having the element 20. The supply path of the medium 16 is sealed off in a gastight manner by the connecting line 13a with respect to the space 23, which is located between two separators 21, lying on each other, of two fuel cells of the fuel-cell block. The disposal of the medium 16, after it has flowed over the active surface, along the separator 21 and the anode of the fuel-cell block, runs conversely in accordance with the same scheme.

Figure 3:
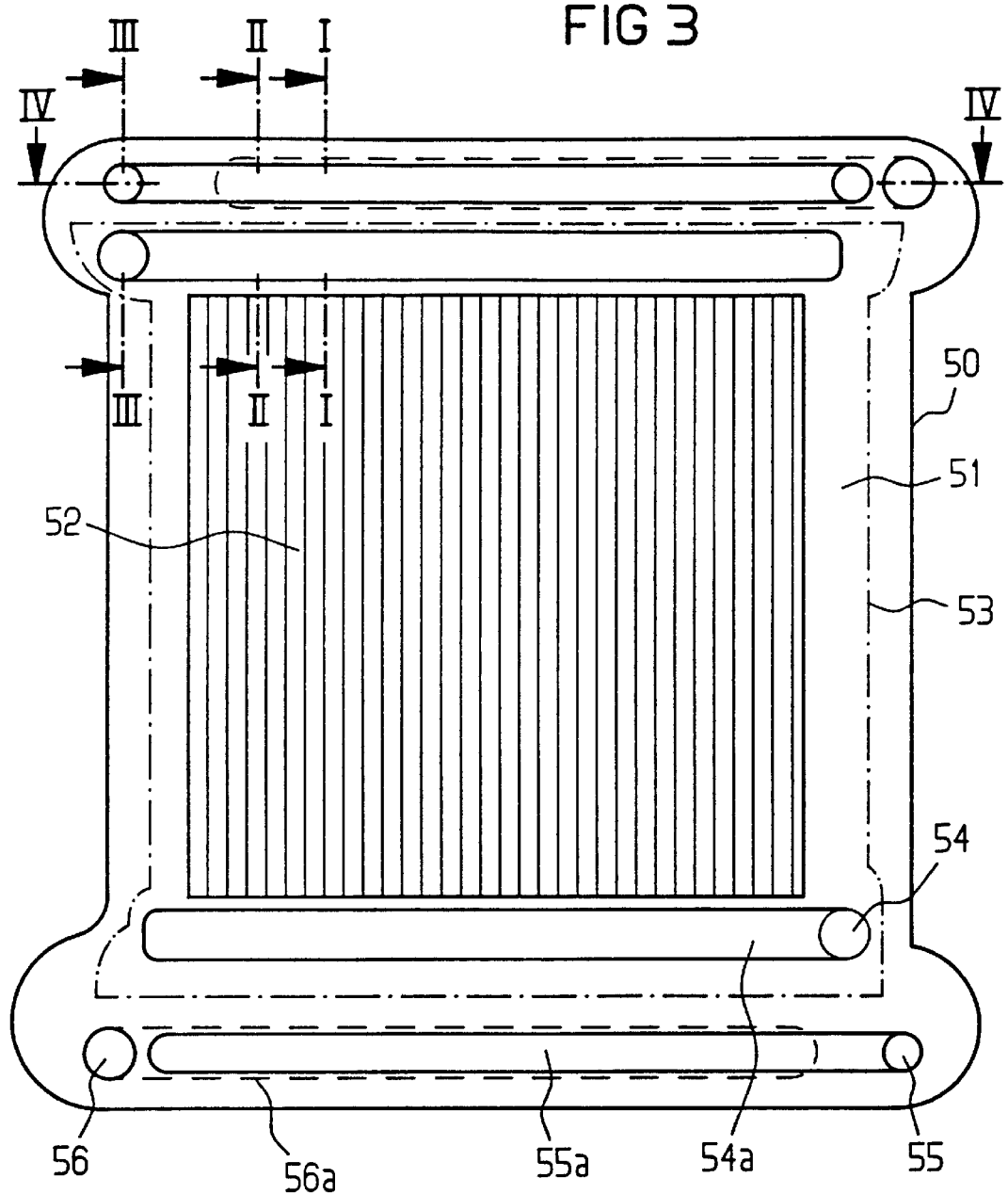
FIG. 3 therefor a top view of an novel fuel cell.

FIG. 3 shows a top view of a cell surface 50 of a novel fuel cell, it being possible once more to see the edge region 51 and the active surface 52, at which the conversion takes place. Located in the edge region is the connecting line 53, which corresponds to the connecting line 13 of the prior art shown (FIG. 1), it being possible, according to the invention, to dispense with the connecting lines which correspond to the connecting lines 13a and 13b. At the corners, it is possible to see the axial supply ducts 54, 55 and 56. The media are transported along these axial ducts to the cell surface and away from the cell surface. The distribution ducts 54a, 55a and 56a are arranged in a staggered and stacked manner, it being possible to see 54a staggered, that is to say above the distribution duct 55a in the plan view, and 56a, which is marked by the dashed line, being arranged stacked in relation to 55a and therefore lying below it in this view. The distribution duct 54a is separated from the distribution duct 55a by the connecting line 53. Thanks to the distribution ducts, which run along the entire edge side length, the media can flow uniformly toward the whole of the active surface 52. The point-like inlet according to the prior art is in this case replaced in favor of the more advantageous inlet along one side edge. For this reason, there are no longer any undersupplied regions as there were in the case of diagonal flow, and the inflow velocity of the medium onto the active surface is reduced.

Figure 4:
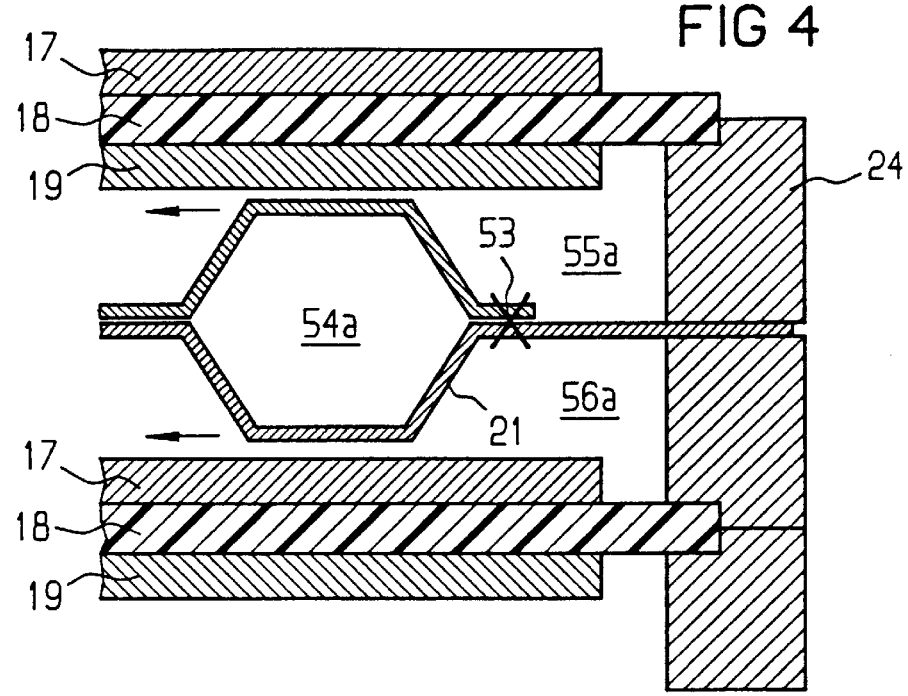
FIG. 4 therefor a partial cross section (along the line I—I in FIG. 3) through a block of fuel cells made in accordance with the present invention (the line I—I running along a contact line of the separators 21)

FIG. 4 shows a partial cross section through a fuel-cell stack, which is constructed from novel fuel cells. The partial cross-section is made along the line I—I of FIG. 3, which runs over the active surface, along a contact line between the separators 21 of two fuel cells that are located one on the other. FIG. 4 shows the section through FIG. 3 for a design of the active surface 52 having flutes. In the case of the configuration of the cell surface with flutes, the contact lines in this case result when the maximum elevation of one separator rests on the maximum depression of the subsequent separator. To the right of the connecting line (adhesively bonded or welded joint), a separator is led to the outside, in order to separate the anode spaces and cathode spaces.

On the right and on the outside, it is again possible to see the edge region of the fuel-cell stack with the seals 24 and the connecting line 53, which tightly seals off the space between two fuel cells which are stacked on each other and are connected in series. At the top and the bottom, it is in each case possible to see the triple unit of the fuel cell, namely the anode 17, the electrolyte 18 and the cathode 19. The element 20 can be dispensed with, as shown in FIG. 4 (but may also be kept, for example in order to improve the making of contact). The separator 21 is not located at a certain distance from the electrode, as in the prior art, but is located immediately adjacent to it, as a result of which, together with the electrode itself, it defines the anode space or cathode space. Between two fuel cells that rest on one another in a stack, the separators 21 touch along the contact line in such a way that they define cavities, in particular ducts or flutes 23 (FIG. 5), in order to accommodate the cooling medium, the cavities also including the cooling-medium distribution duct 54a and being sealed off tightly by the connecting lines 53a. In the case of the operation shown here of the fuel cell in parallel flow, the three media oxidant $O_2$, fuel $H_2$ and coolant $H_2O$ flow in the same direction, from right to left. Because of the staggered arrangement, the oxidant and fuel distribution ducts 55a and 56a are located to the right of the coolant distribution duct 54a. The surface on which the coolant carries out the heat exchange between the cathode space or anode space and the space in which the coolant is located can, as in the case illustrated, be of rectilinear configuration, but can also assume any other surface structure, in particular including one having knobs or having a fluted structure, which, for its part, can again be configured to be rectilinear or curved. The knobs may, if appropriate, be made of electrically conductive material (in order to lead away the power produced) and may be hollow, or else solid. The reactants $O_2$ and $H_2$ then flow around these knobs. The average flow direction, however, is generally transverse or even approximately perpendicular to the supply ducts. The outward shapings of the metal sheets or plates of the separators 21 are used to optimize the flow of all three media, both in the edge region 51 and over the active surface 52. In addition, other components (made of metal, plastic or other material) can be used.

Figure 5:
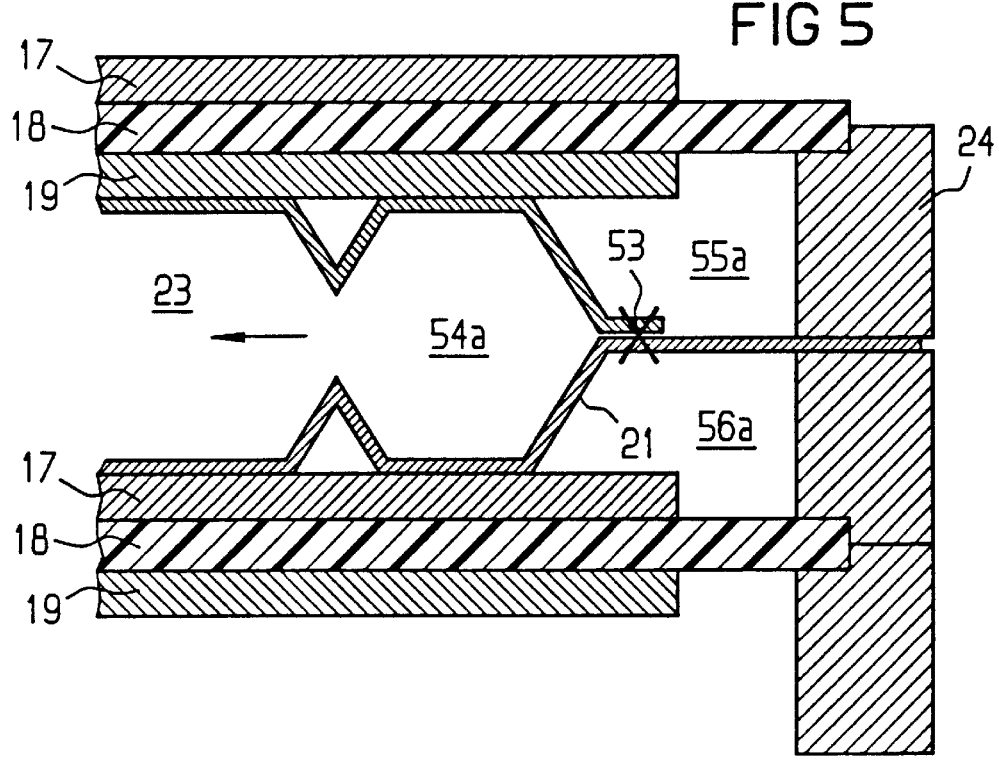
FIG. 5 is a further partial cross-section (along the line II—II from FIG. 3, which runs along a contact line of a separator 21 with an electrode 17/19)

FIG. 5 shows a partial cross-section through a novel fuel-cell stack along the line II—II (which runs along a contact line of the separators 21 with the anode 17 and, toward the top, with the cathode 19) in FIG. 3. On the extreme right, it is again possible to see the seals 24 of the fuel-cell stack, as well as the triple unit, the anode 17, the electrolyte 18 and the cathode 19. The separators 21 are connected via a connecting line 53 and define the space 23, in which the coolant flows toward the surface. The distribution ducts 56a and 55a are in each case bounded on one side by a separator 21 and on the other side by the electrodes 17 and 19. The separators 21 have regions in which they make contact with the electrocles. The distribution duct 54a, like the space 23, is bounded on two sides by separators 21.

Figure 6:
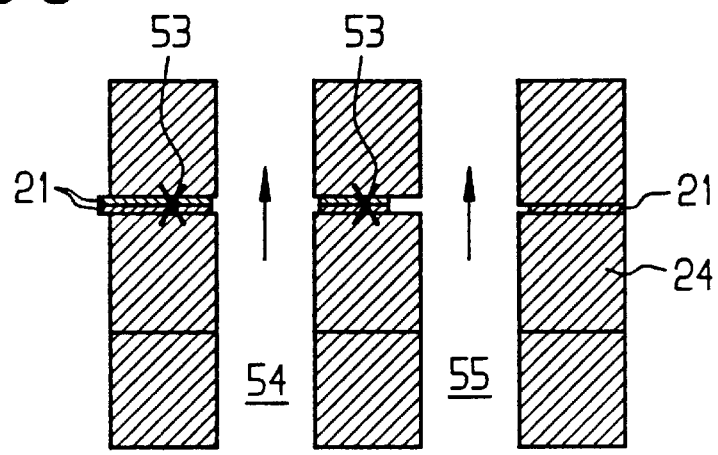
FIG. 6 is a third partial cross-section (along the line III—III in FIG. 3)

FIG. 6 shows a partial cross-section along the line III—III in FIG. 3. On the extreme right, it is in turn possible to see the seals 24 and a separator 21, which is unavoidable in order to separate the reactant spaces in the adjacent distributor ducts. Located on the left, adjacent to the first row of seals, is the supply duct 55, in which the oxidant flows axially from bottom to top. To the left of the axial supply duct 55 it is in turn possible to see seals 24, as well as separators 21 having the connecting line 53, which separates the distribution ducts 55a and 54a, which are arranged in a staggered manner and have their start at the section III—III, from each other. To the left of this, there is the axial supply duct 54, which is in turn sealed off from the environment by a connecting line 53 and seals 24. The second connecting line 53 is once more the outer boundary line of the overall fuel cell (as can be seen from FIG. 3) and is in any case not an additional connecting line corresponding to the connecting lines 13b in FIG. 1.

Figure 7:
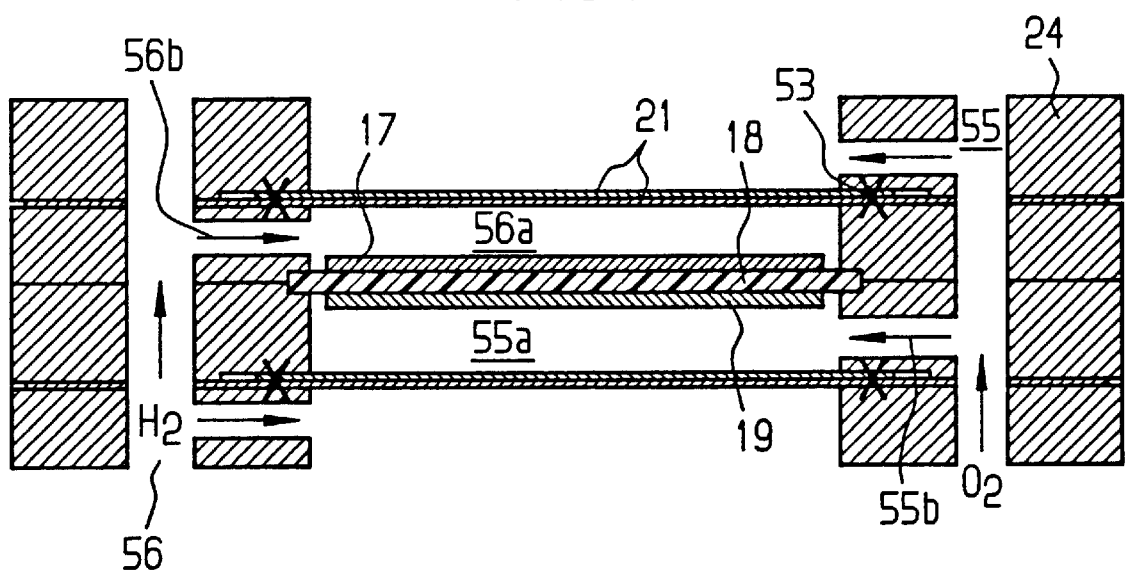
FIG. 7 is a fourth partial cross-section (along the line IV—IV in FIG. 3) through a cell block made of novel fuel cells.

Finally, FIG. 7 shows a partial cross-section of FIG. 3 along the line IV—IV. Once more, from the right to the left, it is firstly possible to see the edge seal having the seals 24 and the separator. To the left of this, there is the axial supply duct 55 having the outlet opening 55b, which opens into the radial distribution duct 55a, which is visible over its entire length in this partial cross-section. The distribution duct 55a is bounded on one side by the cathode 19 and on the other side by the separators 21. Adjacent to the cathode 19 there is once more the electrolyte 18 and the anode 17, which, for its part, in turn defines an edge of the distribution duct 56a. Going further to the left, the distribution duct 56a is connected to the axial supply duct 56 via the inlet opening 56b. The supply duct 56 in turn connects to seals 24 on the left-hand side. In comparison with the prior art, in the present embodiment the inlet and outlet openings of the medium are located directly on the cell surface on which the medium is to be converted, that is to say, in the present example, the inlet opening 55b is located at the same level as the cathode 19, so that the medium neither flows in in a point-like fashion nor impinges directly on the electrode. In addition, according to the invention the inflow velocity is lower. Not only are the connecting lines 13a and 13b and the element 20 of the prior art dispensed with in this way, according to the invention, but the course of the flow of the media is made uniform.

Fuel cells according to the present invention can be operated both individually and in a stack, connected in series, as a battery. The use of such fuel cells or batteries ranges from the automobile drive as far as the power supply to entire houses and residential units. The novel fuel cell is in no way restricted to the embodiments shown in the figures, but may also assume all the other configurations by means of which the principle of the invention can be implemented.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A fuel cell comprising:
   a cell surface comprising a cathode, an anode and an electrolyte disposed between the cathode and anode, the cell surface further comprising an underside and a side edge, the side edge having a length,
   the fuel cell further comprising a coolant distribution duct that extends along at least 50% of the length of the side edge, the coolant distribution duct being in communication with the underside of the cell surface and providing coolant to the underside of the cell surface.
   the coolant distribution duct being laterally staggered along the side edge with respect to the oxidant and fuel distribution ducts.

2. The fuel cell of claim 1 further comprising an oxidant distribution duct and a fuel distribution duct, the oxidant distribution duct and fuel distribution duct being disposed parallel to the coolant distribution duct and extending along the side edge of the cell surface,
   the coolant, oxidant and fuel distribution ducts being vertically staggered with respect to each other.

3. The fuel cell of claim 1 wherein the coolant distribution duct is connected to a coolant supply duct, the coolant supply duct being disposed perpendicular to the coolant distribution duct.

4. The fuel cell of claim 2 wherein the fuel distribution duct is connected to a fuel supply duct, the fuel supply duct being disposed perpendicular to the fuel distribution duct.

5. The fuel cell of claim 1 wherein the cell surface comprises a plurality of side edges, each of the side edges having a length, the coolant distribution duct extending along at least 50% of the length of one of said side edges.

6. The fuel cell of claim 1 wherein the coolant distribution duct extends along a portion of the length of the side edge that ranges from about 80% to about 100% of the length of the side edge.

7. A fuel cell comprising:
   a cell surface comprising a cathode, an anode and an electrolyte disposed between the cathode and anode, the cell surface further comprising an underside and opposing first and second side edges, the first and second side edges having a length, the fuel cell further comprising a first coolant distribution duct that extends along at least 50% of the length of the first side edge, the first coolant distribution duct being in communication with the underside of the cell surface, the first coolant distribution duct being connected to a coolant supply duct and providing communication between the underside of the cell surface and the coolant supply duct, the fuel cell further comprising a first oxidant distribution duct and a first fuel distribution duct, the first oxidant distribution duct and the first fuel distribution duct being disposed parallel to the first coolant distribution duct and extending along the first side edge of the cell surface, the first coolant distribution duct, the first oxidant distribution duct and the first fuel distribution duct being laterally staggered with respect to each other, the fuel cell further comprising a second coolant distribution duct that extends along at least 50% of the length of the second side edge, the second coolant distribution duct being in communication with the underside of the cell surface, the second coolant distribution duct being connected to a coolant disposal duct and providing communication between the underside of the cell surface and the coolant disposal duct.

8. The fuel cell of claim 7 wherein the first fuel distribution duct is connected to a fuel supply duct, the fuel supply duct being disposed perpendicular to the first fuel distribution duct.

9. The fuel cell of claim 7 further comprising a second oxidant distribution duct and a second fuel distribution duct, the second oxidant distribution duct and the second fuel distribution duct being disposed parallel to the second coolant distribution duct and extending along the second side edge of the cell surface, the second coolant distribution duct, the second oxidant distribution duct and the second fuel distribution duct being vertically staggered with respect to each other.

10. The fuel cell of claim 9 wherein the second fuel distribution duct is connected to a fuel disposal duct, the fuel disposal duct being disposed perpendicular to the second fuel distribution duct.

11. The fuel cell of claim 7 wherein the first coolant distribution duct extends along a portion of the length of the first side edge that ranges from about 80% to about 100% of the length of the first side edge.

12. The fuel cell of claim 7 wherein the second coolant distribution duct extends along a portion of the length of the second side edge that ranges from about 80% to about 100% of the length of the second side edge.

13. A fuel cell comprising:

a cell surface comprising a cathode, an anode and an electrolyte disposed between the cathode and anode, the cell surface further comprising an underside and opposing first and second side edges, the first and second side edges having a length, the fuel cell further comprising a first coolant distribution duct that extends along at least 80% of the length of the first side edge, the first coolant distribution duct being in communication with the underside of the cell surface, the first coolant distribution duct being connected to a coolant supply duct and providing communication between the underside of the cell surface and the coolant supply duct, the fuel cell further comprising a first oxidant distribution duct and a first fuel distribution duct, the first oxidant distribution duct and the first fuel distribution duct being disposed parallel to the first coolant distribution duct and extending along the first side edge of the cell surface, the first fuel distribution duct being connected to a fuel supply duct, the fuel supply duct being disposed perpendicular to the first fuel distribution duct, the first coolant distribution duct, the first oxidant distribution duct and the first fuel distribution duct being vertically staggered with respect to each other, the first coolant distribution duct being laterally staggered along the first side edge with respect to the first oxidant distribution duct and the first fuel distribution duct, the fuel cell further comprising a second coolant distribution duct that extends along at least 80% of the length of the second side edge, the second coolant distribution duct being in communication with the underside of the cell surface, the second coolant distribution duct being connected to a coolant disposal duct and providing communication between the underside of the cell surface and the coolant disposal duct, the fuel cell further comprising a second oxidant distribution duct and a second fuel distribution duct, the second oxidant distribution duct and the second fuel distribution duct being disposed parallel to the second coolant distribution duct and extending along the second side edge of the cell surface, the second fuel distribution duct being connected to a fuel disposal duct, the fuel disposal duct being disposed perpendicular to the second fuel distribution duct, the second coolant distribution duct, the second oxidant distribution duct and the second fuel distribution duct being vertically staggered with respect to each other, the second coolant distribution duct being laterally staggered along the second side edge with respect to the second oxidant distribution duct and the second fuel distribution duct.

* * * * *